…

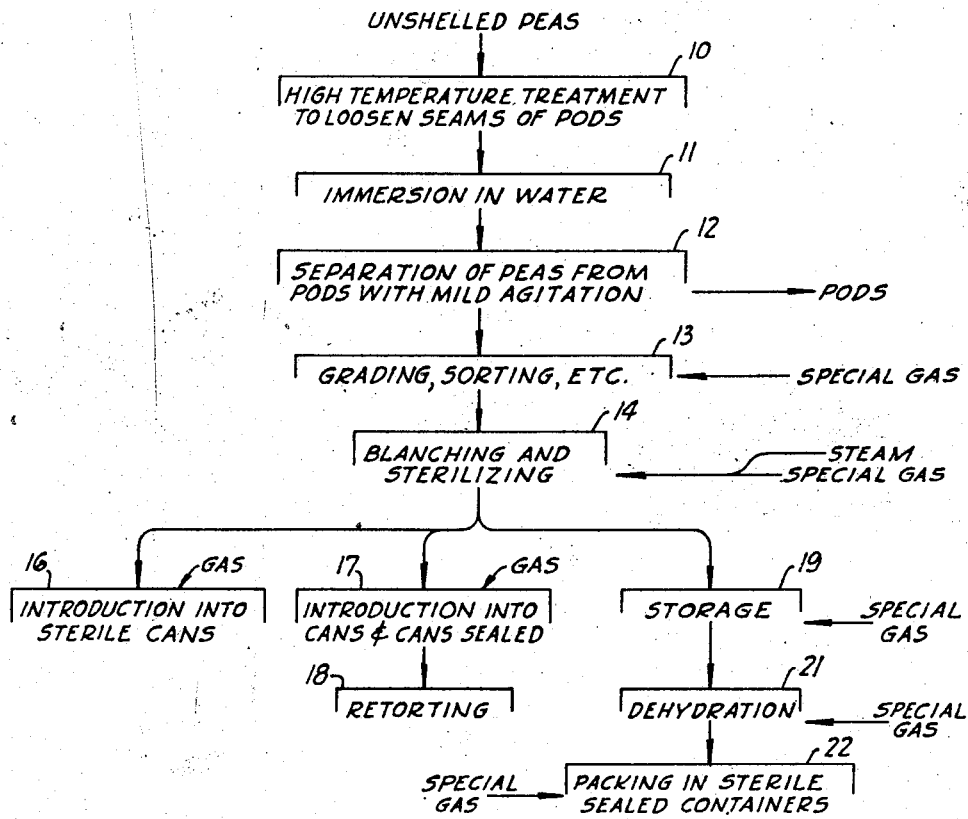

UNITED STATES PATENT OFFICE 2,437,155

PROCESS FOR THE TREATMENT OF GREEN PEAS

Melville E. Dunkley, Modesto, Calif.

Application February 5, 1944, Serial No. 521,209

1 Claim. (Cl. 146—229)

This invention relates generally to processes for the treatment of fresh green peas, and particularly processes which provide marketable preserved products.

In the past it has been common practice to harvest peas by cutting the entire vine when the pods have reached maturity, after which the vines and the pods are passed through a machine called a "viner." In the viner the mass is subjected to violent agitation and beating, during the course of which the peas are freed from the pods. The freed peas are then collected separate from the vines and the pods, and are treated by conventional methods to provide preserved products, as for example by canning, dehydration, or freezing. This conventional procedure is objectionable for several reasons, including the fact that in the viner there is a substantial loss because of crushing and bruising of the peas. If it is attempted to operate the viner to decrease the percentage of crushed and broken peas, then the percentage of unshelled peas increases. In addition this conventional practice offers an opportunity for spoilage and deterioration to occur, because of mutilation of the peas, and because of exposure to the atmosphere over considerable periods of time before further treatment for preservation.

Assuming that peas obtained as described above are to be canned, as they are received at the canning plant, they are passed through a device which washes the peas, and removes the broken and crushed fragments. They are then passed through devices generally consisting of perforated cylinders or reels, which size and grade the peas as desired. The separate grades are then passed through a selecting machine for segregating them into different groups depending upon maturity and hardness, after which they are passed over sorting belts where foreign fragments and rejects (i. e. off color or broken peas) are removed manually. After being thus graded and selected, the peas are subjected to blanching, which is carried out by passing them through a hot water bath at temperatures of from 180 to 212° F. This serves to set the green color of the peas, and tends to inhibit enzymic activity. After this treatment the peas are placed in cans, hot water is added and the cans are then sealed and retorted at a temperature of about 240° F., to completely sterilize and cook the contents.

Where the peas are dried in place of being canned, the blanched peas are passed through conventional dehydrators where they are contacted with warm drying air. Likewise the blanched peas may be preserved by conventional freezing methods.

In the treatment described above, a very substantial loss in vitamin values and other food constituents occurs before final preservation, due particularly to exposure to air and to washing with water.

It is an object of the present invention to provide a process for the treatment of peas which will obviate the use of the conventional viner, and which will make possible the preservation of peas without substantial impairment of vitamin or other nutritive values, and with a minimum amount of wastage.

Further objects of the invention will appear from the following description in which the preferred embodiment of the invention has been set forth in detail in conjunction with the accompanying drawing.

A particular feature of my process is the fact that unshelled peas are subjected to a special high temperature treatment, followed by immersion in water, whereby the seams of the pod loosen themselves and permit removal of the peas without severe mechanical agitation or beating. In addition the present invention treats the peas in a novel way following removal from the pods, so that they are preserved without further deterioration.

Referring to the flow sheet of the accompanying drawing, the procedure which I prefer to employ is as follows: The entire vine (with pods) is harvested by known machinery and methods, or if desired the pods may be harvested by hand picking. Tranportation and temporary storage of the peas in the pod with or without the vines does not require ice, and does not involve loss in vitamin or other nutritive values.

The entire vine with the pods, or the pods without the vines, are then subjected to the special high temperature treatment 10. This is carried out by passing the pods through a high temperature zone for a short interval. By a high temperature zone I have reference to one of the order of 2000° F. which is capable of some immediate searing and charring of the pod. The time interval should be such that there is no opportunity for the heat to penetrate to the peas. For example at a temperature of about 2000° F. the time period of treatment can be of the order of from two to four seconds.

The equipment used for the operation 10 may vary in practice. For example one can provide a belt conveyor for carrying a layer of the pods through an enclosed muffle. The interior of the muffle can be heated with a flame of natural fuel gas, so that the pods are virtually contacted with the flame.

I have discovered that treatment as described above serves to loosen the seams of the pods, so that thereafter the peas can be readily removed with only gentle agitation.

Following the above treatment the charred pods and vines are immediately dropped into cool water (step 11) which serves to chill the pods and thus prevent undesired penetration of heat to the peas. While in the water the pods are gently agitated, and because of the previous heat treatment, the seams open and the peas fall out. The peas are then separated from the pods by simple screening, as indicated by step 12 of the flow sheet.

The peas after their removal can be passed through grading and sorting operations 13 as desired. I prefer in these operations to exclude oxygen by housing the machines employed, and by supplying the housings of the machines with special gas as indicated.

Following step 13 the peas are subjected to blanching 14 to set the color and to sterilize and inhibit enzymic activity. To carry out this blanching the peas are passed through a closed chamber in which is maintained an atmosphere of my special gas heated to a temperature of the order of from 250 to 350° F., together with sufficient steam or water vapor to prevent dehydration. This treatment will not only blanch the peas, but will also sterilize and cook the peas to the point of palatability. Its merit, over conventional blanching operations which use steam or hot water, is that there is no loss of vitamins or other deterioration through oxidation or washing. Enzymic activity is inhibited by my special gas as explained in my co-pending application Serial No. 515,663, filed December 27, 1943.

Assuming that the blanched peas are to be canned, I prefer to convey them to the canning operation 16 under sterile conditions, with introduction into sterile cans, followed by sealing of the cans. To prevent contamination during such canning, all operations can be enveloped in my special sterile gas. Such canned peas require no further cooking, and provide a product far superior to present day canned peas with respect to vitamin value, color, and palatability.

Instead of the special canning procedure described above, one can proceed by conventional methods, as by introducing the peas into cans at 17, together with hot water, after which the cans are sealed and retorted at 18.

Should one desire to dry the peas, they can be stored at 19, preferably while being enveloped in an atmosphere of my special gas, after which they are passed through a dehydrator at 21. This dehydration step can be carried out in two temperature stages, with the drying gas in the first stage being at a temperature of the order of 200° F., and the gas in the second stage ranging from 160 to 175° F. The drying gas employed for dehydration is preferably my special gas as will be presently described. Following drying the peas are packed into suitable sterile containers (step 22) while being kept in an atmosphere of my special gas and the containers are sealed.

Where a frozen product is required, the blanched peas are subjected to deep freezing according to any one of a number of prevailing methods. During freezing and in transit to the freezing equipment it is desirable to keep the blanched peas enveloped in an atmosphere of my special gas.

Reference has been made to the use of a special non-oxidizing gas for various operations. For this purpose I prefer to use a gas having a marked enzyme inhibiting effect upon the peas. Such a gas and apparatus for its generation are disclosed in my co-pending application Serial No. 515,663, filed December 27, 1943, and entitled "Food treatment process." Briefly the apparatus employed for generation of the gas consists of a combustion chamber into which a fuel gas like natural gas is introduced together with a controlled amount of combustion-supporting air. The combustion mixture is regulated so that the gaseous products of combustion contain only traces of free oxygen, together with substantial amounts of carbon monoxide. Preferably the free oxygen content of the gas is maintained less than 0.5% and in a typical instance where natural gas is employed the analysis of the gaseous products of combustion will be as follows:

| | Per cent |
|---|---|
| Carbon dioxide, $CO_2$ | 8.2 |
| Acetylene, $C_2H_2$ | 0.1–0.2 |
| Oxygen, $O_2$ | 0.2–0.1 |
| Carbon monoxide, $CO$ | 3.8 |
| Methane, $CH_4$ | 2.2 |
| Nitrogen, $N_2$ | 85.5 |

The gas generated as described above is prepared for use by cooling the same to remove condensible constituents, foreign material is removed by washing, filtration, and any objectionable odors are removed by passing the gas through a suitable absorbant like activated charcoal.

While the effectiveness and peculiar properties of the above gas may be due to small amounts of gases not shown by the above analysis, according to my observations the effectiveness is due primarily to the presence of carbon monoxide and acetylene. These gases in the absence of free oxygen have a remarkable effect in poisoning or immunizing biocatalysts or enzymes such as play an important part in food deterioration and spoilage. In the present process contact of the peas with this special gas in the grading and sorting operation 13 probably effects the poisoning or inhibiting of some enzymes in conjunction with the fact that the gas prevents contact of the material with atmospheric oxygen. More effective and complete inhibiting of enzymes is carried out in the blanching operation 14 where the material likewise is maintained in an atmosphere of my special gas. Thereafter an atmosphere of my special gas is maintained, as in operations 16, 17, 19, 21 and 22, to insure absence of contact with atmospheric oxygen and to insure absence of deterioration and oxidation throughout the entire process. Assuming the packing of dehydrated material in sealed containers, together with my special gas, the effect of the gas in inhibiting enzymes is continued indefinitely until the container is opened.

The advantages of my process will be evident from the foregoing. Harvesting of the pods is a comparatively simple operation which can be carried out from time to time as desired, and should such pods be stored, with or without the vines, for an appreciable period of time there will be no marked deterioration of the peas, even though storage is at normal temperatures. Removal of the peas according to my process does not involve severe agitation and beating, and therefore practically no peas are crushed or otherwise mutilated. Carrying out the complete process as specified to produce a final preserved product, results in a preserved product definitely superior in quality, having reference particularly to vitamin content, color and palatability.

I claim:

In a process for the treatment of green peas, the steps of momentarily subjecting the unshelled pea pods to a relatively high temperature of the order of 2000° F., for a relatively short period of time such as a period of the order of from two to four seconds, thereafter chilling the pods by contact with water, gently agitating the pods while immersed in the water to remove the peas from the pods, and then removing peas from the pods by screening.

MELVILLE E. DUNKLEY.

REFERENCES CITED

The following references are of record in the file of this patent:

UNITED STATES PATENTS

| Number | Name | Date |
| --- | --- | --- |
| 45,765 | Stauton | Jan. 3, 1865 |
| 719,618 | Scovill | Feb. 3, 1903 |
| 870,855 | Staines | Nov. 12, 1907 |
| 1,017,144 | Gironcoli | Feb. 13, 1912 |
| 1,236,690 | Dunkley | Aug. 14, 1917 |
| 1,250,079 | Bart | Dec. 11, 1917 |
| 1,753,902 | Nevills | Apr. 8, 1930 |
| 1,975,012 | McKinnis | Sept. 25, 1934 |
| 1,996,171 | Pennington | Apr. 2, 1935 |
| 2,004,379 | Michels | June 11, 1935 |
| 2,218,466 | Gray et al. | Oct. 15, 1940 |

FOREIGN PATENTS

| Number | Country | Date |
| --- | --- | --- |
| 106,472 | Australia | 1939 |
| 413,488 | Great Britain | 1934 |
| 425,903 | Great Britain | 1939 |